(12) United States Patent
Ichikawa et al.

(10) Patent No.: US 7,609,881 B2
(45) Date of Patent: Oct. 27, 2009

(54) DEVICE AND METHOD FOR IMAGE PROCESSING AS WELL AS IMAGE PROCESSING COMPUTER PROGRAM

(75) Inventors: Yukihiko Ichikawa, Kokubunji (JP); Yoshinori Tanaka, Tokyo (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 1026 days.

(21) Appl. No.: 10/689,669

(22) Filed: Oct. 22, 2003

(65) Prior Publication Data
US 2004/0136609 A1 Jul. 15, 2004

(30) Foreign Application Priority Data
Oct. 23, 2002 (JP) ............... 2002-308347

(51) Int. Cl.
G06K 9/00 (2006.01)
G06K 9/34 (2006.01)
G06K 9/46 (2006.01)
G06K 9/66 (2006.01)
H04N 1/387 (2006.01)
H04N 1/46 (2006.01)

(52) U.S. Cl. ............ 382/164; 382/165; 382/173; 382/176; 382/195; 358/463; 358/464; 358/450; 358/538

(58) Field of Classification Search ........... 382/176, 382/173, 284, 180, 302, 305, 164, 165, 195; 358/453, 450, 464, 538; 345/629–637
See application file for complete search history.

(56) References Cited

U.S. PATENT DOCUMENTS 5,596,690 A * 1/1997 Stone et al. ............ 345/630
6,324,305 B1 * 11/2001 Holladay et al. ........... 382/239
6,330,363 B1 * 12/2001 Accad .................... 382/232
7,054,029 B1 * 5/2006 Ohta et al. ............... 358/1.18
2002/0003897 A1 * 1/2002 Tanaka ................... 382/165
2004/0169664 A1 * 9/2004 Hoffman et al. ........... 345/629
2005/0116963 A1 * 6/2005 Bourdev et al. ........... 345/619

FOREIGN PATENT DOCUMENTS

| JP | 05-241315 | 9/1993 |
|---|---|---|
| JP | 6-195421 | 7/1994 |
| JP | 2000-324331 | 11/2000 |
| JP | 2001-357406 | 12/2001 |
| JP | 2002-056403 | 2/2002 |

* cited by examiner

Primary Examiner—Brian P Werner
Assistant Examiner—Randolph Chu
(74) Attorney, Agent, or Firm—Buchanan Ingersoll & Rooney PC

(57) ABSTRACT

The image processing device is equipped with an image area extracting part for extracting a plurality of image areas from image data, an image positional information recognizing part for recognizing positional information of each extracted image area, an attribute recognizing part for recognizing at least attributes concerning whether each extracted image area is a filled closed area or unfilled closed area, a file producing part for producing a file synthesizing a plurality of image areas based on the positional information recognized by the image positional information recognizing part, and a sequence setting part for setting overlying sequence for each image area in accordance with the recognition result of the attribute recognizing part. The file producing part produces the file by overlaying a multiple of image areas in accordance with the overlaying sequence set up by the sequence setting part.

24 Claims, 15 Drawing Sheets

| | STACK | |
|---|---|---|
| | VECTOR GROUP OF ROUTE TO VECTOR-IN-ATTENTION | CONNECTING VECTOR GROUP |
| 1 | $\overrightarrow{AB}$ | $\overrightarrow{BE}$ |
| 2 | | |
| 3 | | |

FIG. 11

| | STACK ||
| | VECTOR GROUP OF ROUTE TO VECTOR-IN-ATTENTION | CONNECTING VECTOR GROUP |
|---|---|---|
| 1 | $\vec{AB}, \vec{BE}$ | $\vec{EG}, \vec{EH}$ |
| 2 | | |
| 3 | | |
| | | |

FIG. 12

| | STACK ||
| | VECTOR GROUP OF ROUTE TO VECTOR-IN-ATTENTION | CONNECTING VECTOR GROUP |
|---|---|---|
| 1 | $\vec{AB}, \vec{BE}$ | $\vec{EG}, \vec{EH}$ |
| 2 | $\vec{AB}, \vec{BE}, \vec{EF}, \vec{FG}, \vec{GE}$ | $\vec{EF}, \vec{EH}$ |
| 3 | | |
| | | |

FIG. 13

| | STACK ||
| | VECTOR GROUP OF ROUTE TO VECTOR-IN-ATTENTION | CONNECTING VECTOR GROUP |
|---|---|---|
| 1 | $\vec{AB}, \vec{BE}$ | $\vec{EG}, \vec{EH}$ |
| 2 | $\vec{AB}, \vec{BE}, \vec{EF}, \vec{FG}, \vec{GE}$ | $\vec{EH}$ |
| 3 | | |
| | | |

| | STACK ||
| | VECTOR GROUP OF ROUTE TO VECTOR-IN-ATTENTION | CONNECTING VECTOR GROUP |
|---|---|---|
| 1 | $\overrightarrow{AB}, \overrightarrow{BE}$ | $\overrightarrow{EH}$ |
| 2 | | |
| 3 | | |

FIG. 18
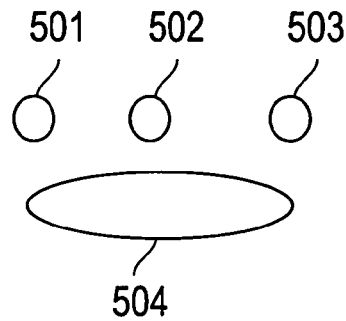
FIG. 19
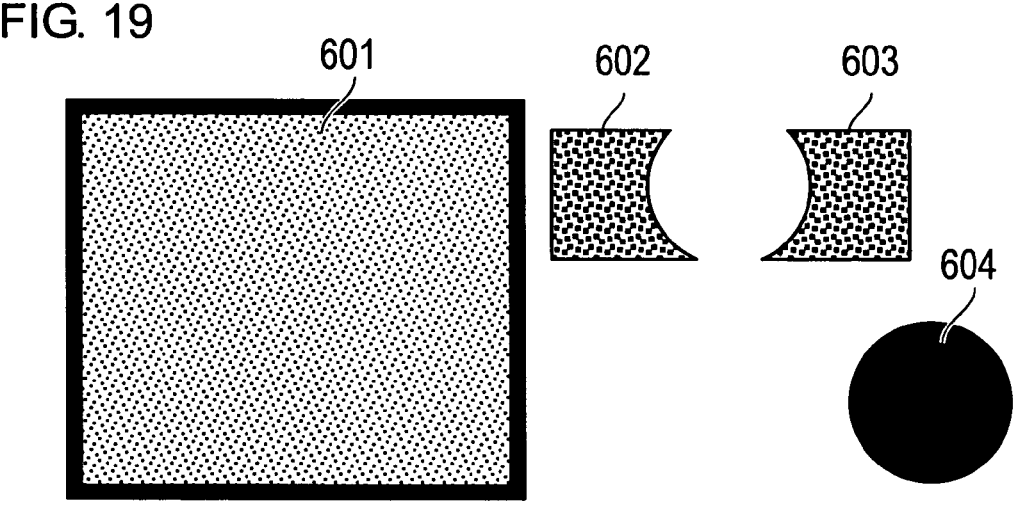
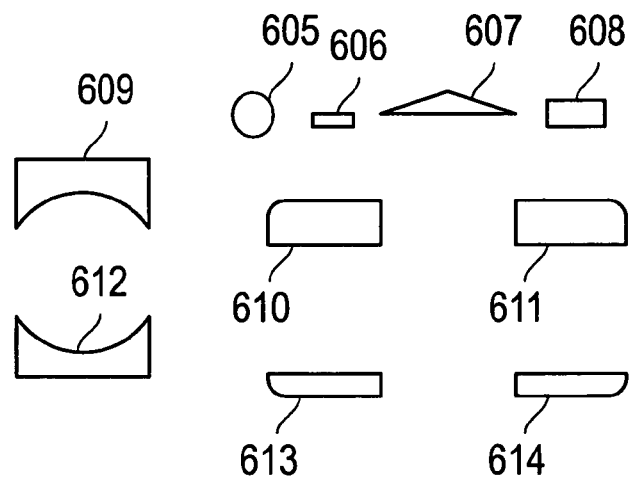

DEVICE AND METHOD FOR IMAGE PROCESSING AS WELL AS IMAGE PROCESSING COMPUTER PROGRAM

This application is based on Japanese Patent Application No. 2002-308347, filed on Oct. 23, 2002, the contents of which are hereby incorporated by reference.

BACKGROUND OF THE INVENTION

1. Field of the Invention

The invention relates to a device and a method for image processing as well as an image processing computer program wherein multiple image areas are extracted from the basic image data according to image attributes (characters, photograph, graphics, etc.), then various image processes are applied to the image areas, and finally the image areas are synthesized to form image data for output.

2. Description of Related Art

Image data obtained by scanning a document with a scanner often has a large volume so that it may be unsuitable for storage or transmission/reception without being treated by a certain process. Therefore, it is often treated with a special imaging process such as compression depending on the type of image data. However, a problem arises when image data consists of a mixture of text image areas, graphic image areas and photographic image areas. More specifically, if irreversible compression suitable for photographic image areas is applied to the image data entirety, the volume of the image data reduces but it will be difficult to read texts. On the other hand, if compression suitable for the text image areas is applied to the image data entirety, a sufficient compression rate will not be achieved. In order to solve this problem, image processing devices have been used wherein text image areas, graphic image areas and photographic image areas are extracted separately, a compression process suitable for the particular area is applied to each area, and finally all the areas are synthesized to produce a document file. Such an image processing device enables us to reduce the file size while maintaining the image quality.

In graphic image areas, in particular, transformation of image data such as bitmap data into vector data is a widely used technique. Also known is a technique in transforming image data such as bitmap data into vector data by first dividing the image data into line areas, unfilled closed areas, and filled closed areas, and then treating each area separately.

However, the above image processing technique of the prior art, wherein a file is produced by synthesizing line areas, unfilled closed areas and filled closed areas, can cause a case where a filled closed area being laid over line areas and unfilled closed areas. Consequently, it causes a problem of not being able to reproduce the original image as the image data of the line areas and unfilled closed areas are hidden by the image data of the filled closed area.

SUMMARY OF THE INVENTION

An object of the present invention is to provide an image processing device and an image processing method as well as an image processing program for obtaining a synthesized file with high reproducibility by preventing image losses due to overlaying of line areas and/or unfilled closed areas with a filled closed area.

According to an aspect of the invention, preferably the image processing device includes an image area extracting part for extracting a plurality of image areas from image data, a positional information recognizing part for recognizing positional information of each extracted image area, an attribute recognizing part for recognizing at least attributes concerning whether each extracted image area is a filled closed area or unfilled closed area, a file producing part for producing a file by synthesizing a plurality of image areas based on the positional information recognized by the positional information recognizing part, and a sequence setting part for setting up overlying sequence for each image area in accordance with the recognition result of the attribute recognizing part. The file producing part produces the file by overlaying the image areas in accordance with the overlaying sequence set up by the sequence setting part.

According to another aspect of the invention, the image processing method includes an image area extracting step of extracting a plurality of image areas from image data, a step of recognizing positional information of each extracted image area, a step of recognizing at least attributes concerning whether each extracted image area is a filled closed area or unfilled closed area, a step of producing a file by synthesizing a plurality of image areas based on the recognized positional information, and a step of setting up overlaying sequence for each image area in accordance with the attribute recognition result. In the step of producing the file, the file is produced by overlaying the image areas in accordance with the overlaying sequence, which has been set up.

According to still another aspect of the invention, a computer program used for image processing executes an image area extracting procedure of extracting a plurality of image areas from image data, a procedure of recognizing positional information of each extracted image area, a procedure of recognizing at least attributes concerning whether each extracted image area is a filled closed area or unfilled closed area, a procedure of producing a file by synthesizing a plurality of image areas based on the recognized positional information, and a procedure of setting up overlaying sequence for each image area in accordance with the attribute recognition result. In the procedure of producing the file, the file is produced by overlaying the image areas in accordance with the overlaying sequence, which has been set up.

BRIEF DESCRIPTION OF THE DRAWINGS

FIG. 9 shows an example of a vector data group when executing the closed area extraction process;

FIG. 10 through FIG. 14 show an example of data stored in a stack when executing the closed area extraction process;

FIG. 15 is a flowchart showing the contents of a filled closed area extraction process shown in step S207 of FIG. 4;

FIG. 18 is a diagram showing unfilled closed areas extracted from the input image data of FIG. 5;

FIG. 19 is a diagram showing filled closed areas extracted from the input image data of FIG. 5;

DESCRIPTION OF THE PREFERRED EMBODIMENTS

The preferred embodiments of the invention will be described in detail below with reference to the accompanying drawings.

Figure 1:
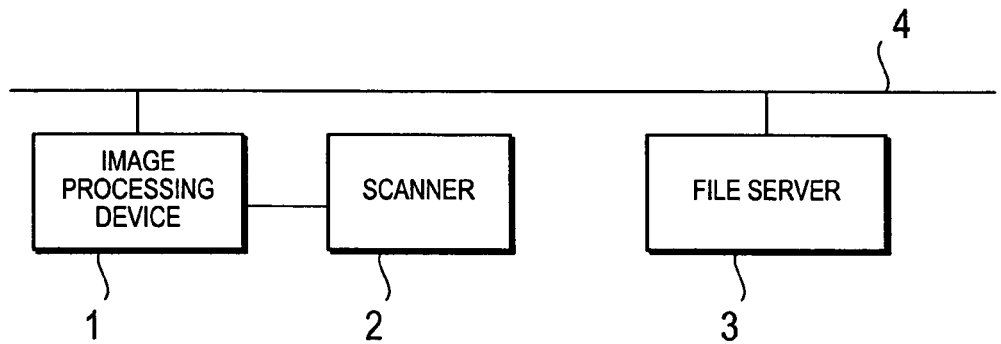
FIG. 1 is a block diagram showing the entire constitution of an image processing system including an image processing device according to an embodiment of the present invention.

FIG. 1 is a block diagram showing the entire constitution of an image processing system including an image processing device according to an embodiment of the present invention. The image processing system is equipped with an image processing device 1, a scanner 2 for outputting image data by reading document image, and a file server 3 which is the output destination device for the image data. Image processing device 1, scanner 2, and file server 3 are interconnected for communicating with each other via a network 4. The types and the number of equipment to be connected to network 4 are not limited to those shown in FIG. 1.

Figure 2:
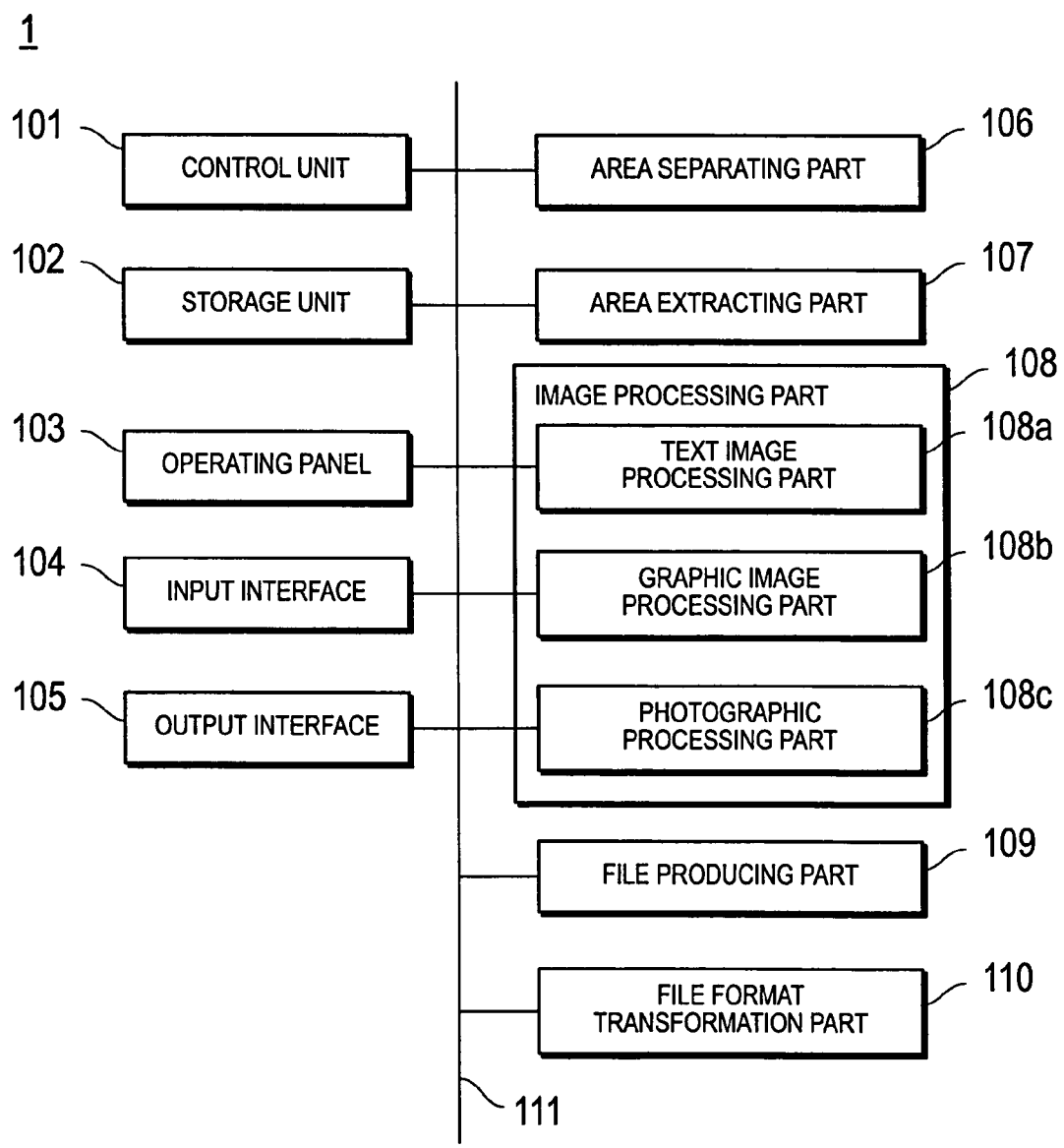
FIG. 2 is a block diagram showing the constitution of an image processing device shown in FIG. 1.

FIG. 2 is a block diagram showing the constitution of the image processing device 1 according to the present embodiment. In FIG. 2, image processing device 1 is equipped with a control unit 101, a storage unit 102, an operating panel 103, an input interface 104, an output interface 105, an area separating part 106, an area extracting part 107, an image processing part 108, a file producing part 109, and a file format transformation part 110. These units and parts are interconnected for exchanging signals via a bus 111.

Preferably, control unit 101 is a CPU, controls various units and parts indicated above, and executes various arithmetic processes according to a computer program.

Storage unit 102 includes recording media and memories such as a ROM, RAM and hard disk. ROM stores various programs and parameters. RAM stores programs and data temporarily as a working area. These recording media such a hard disk is used for storing various programs and parameters, or temporary holding various data such as image data obtained by image processing.

Operating panel 103 preferably includes keys and a panel for setting image data destinations and output file formats, or indicating starts of actions. The image data output destinations are designated by entering IP addresses, host names, and mail addresses of image output devices. The output file formats are designated by selecting file formats of output files to be transmitted to the image output devices.

Input interface 104 is an interface for receiving image data input from image input devices such as a scanner 2. Output interface 105 is an interface for transmitting output files to image output destination devices such as file server 3.

Area separating part 106 identifies areas containing text images ("text image areas"), areas containing graphic images ("graphic image areas"), and areas containing photographic images ("photographic image areas"), and separates text image areas, graphic image areas, and photographic image areas.

Area extracting part 107 extracts text image areas, graphic image areas, and photographic image areas from the input image data. Area extracting part 107 also recognizes positional information of each of these image areas. In other words, text image data consisting of text image constituting pixels, graphic image data consisting of graphic image constituting pixels, and photographic image data consisting of photographic image constituting pixels are obtained when area extracting part 107 extracts text image areas, graphic image areas, and photographic image areas.

Image processing part 108 has a text image processing part 108a, a graphic image processing part 108b, and a photographic processing part 108c. Text image processing part 108a, graphic image processing part 108b, and photographic processing part 108c apply appropriate image processing to extracted text image areas, graphic image areas, and photographic image areas respectively.

File producing part 109 synthesizes the image processed text image areas, graphic image areas, and photographic image areas based on the positional information and produces a file in accordance with the internal file format. File format transformation part 110 transforms the file produced in accordance with the internal file format into a preset output file format. Incidentally, the output file formats include various document formats according to various word processing application programs, or general purpose formats such as PostScript (registered trademark), PDF, JPEG, and TIFF.

Scanner 2 scans documents to generate image data and transmit the obtained image data to the image processing device. File server 3 is a computer that stores files received via network 4 and transfers the stored files to other equipment on network 4 upon receiving transfer requests.

Network 4 may include various networks such as a LAN, a WAN that connects LANs using a dedicated line, and others. Network 4 connects computers, peripheral equipment and network equipment based on various standards such as Ethernet (registered trademark), TokenRing, and FDDI.

Figure 3:
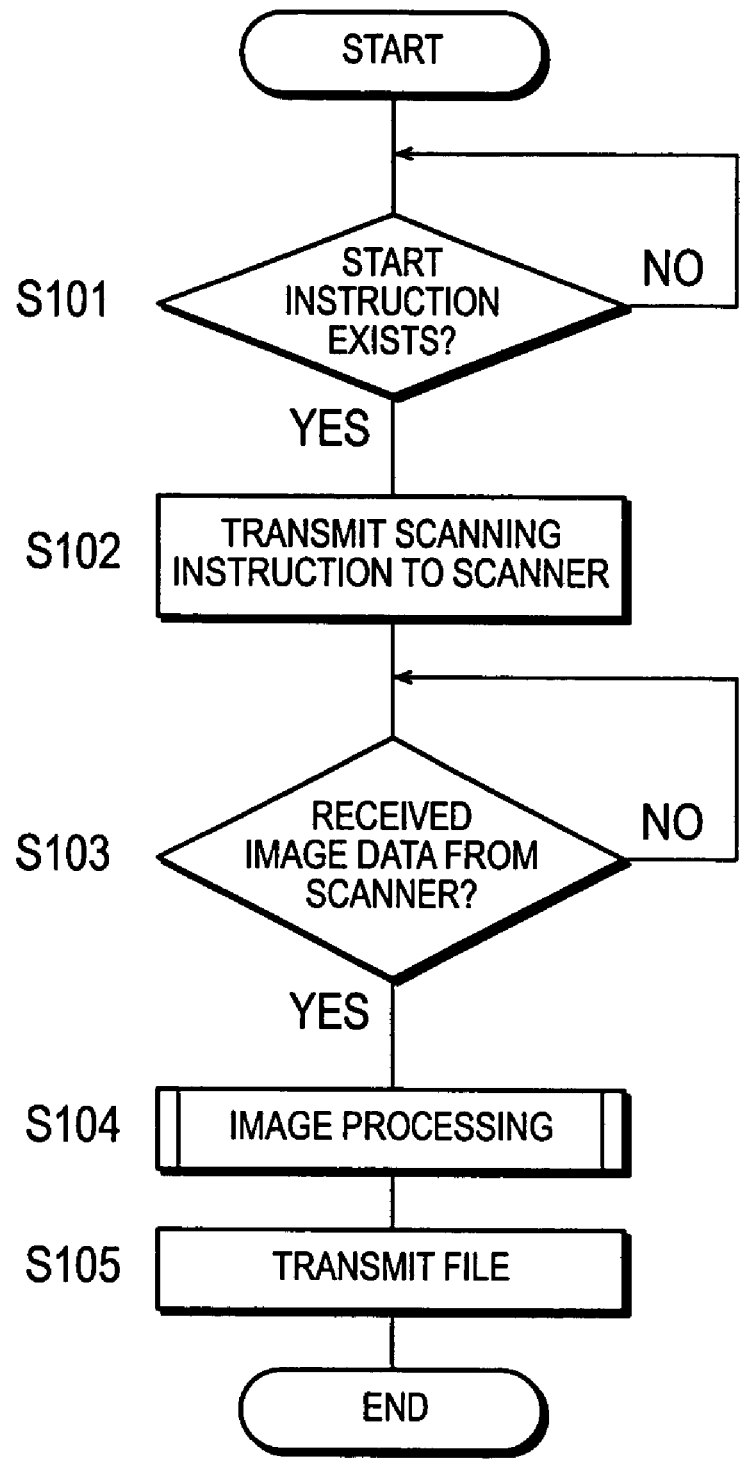
FIG. 3 is a flowchart showing the sequence of image processing by means of the image processing device of FIG. 1.

Next, the outline of the image processing system according to this embodiment will be described below. FIG. 3 is a flowchart showing the sequence of image processing by means of image processing device 1 in this embodiment. The algorithm shown in FIG. 3 is stored in storage unit 102 as a control program and is executed by control unit 101.

In FIG. 3, image processing device 1 stands by until it is ordered to start image processing (S101: No). When it receives a start instruction from the user via operating panel 103 (S101: Yes), a document scan instruction will be transmitted to scanner 2 (S102). Image processing device 1 stands by until it receives image data from scanner 2 (S103: No). Upon receiving a document scan instruction from image processing device 1, scanner 2 scans a document set on the prescribed position to obtain image data. Scanner 2 transmits the obtained image data to image processing device 1. Alternatively, the image processing start instruction can be entered from other equipment on network 4, or from scanner 2. In such a case, steps S101 and S102 can be omitted. The image data does not have to be limited to those entered from scanner 2, rather it can be entered from other equipment on network 4, or can be stored in storage unit 102 of image processing device 1.

Upon receiving image data from scanner 2 via input interface 104 (S103: Yes), image processing device 1 stores the received input image data in storage unit 102, and then applies image processing (S104) to the input image data. The contents of image processing (S104) will be described later. The image processing transforms the image data into a file of a specified format. Image processing device 1 transmits the obtained file to the file server 3 via output interface 105 and network 4 (S105). The file transfer destination is not limited to the file server.

Figure 4:
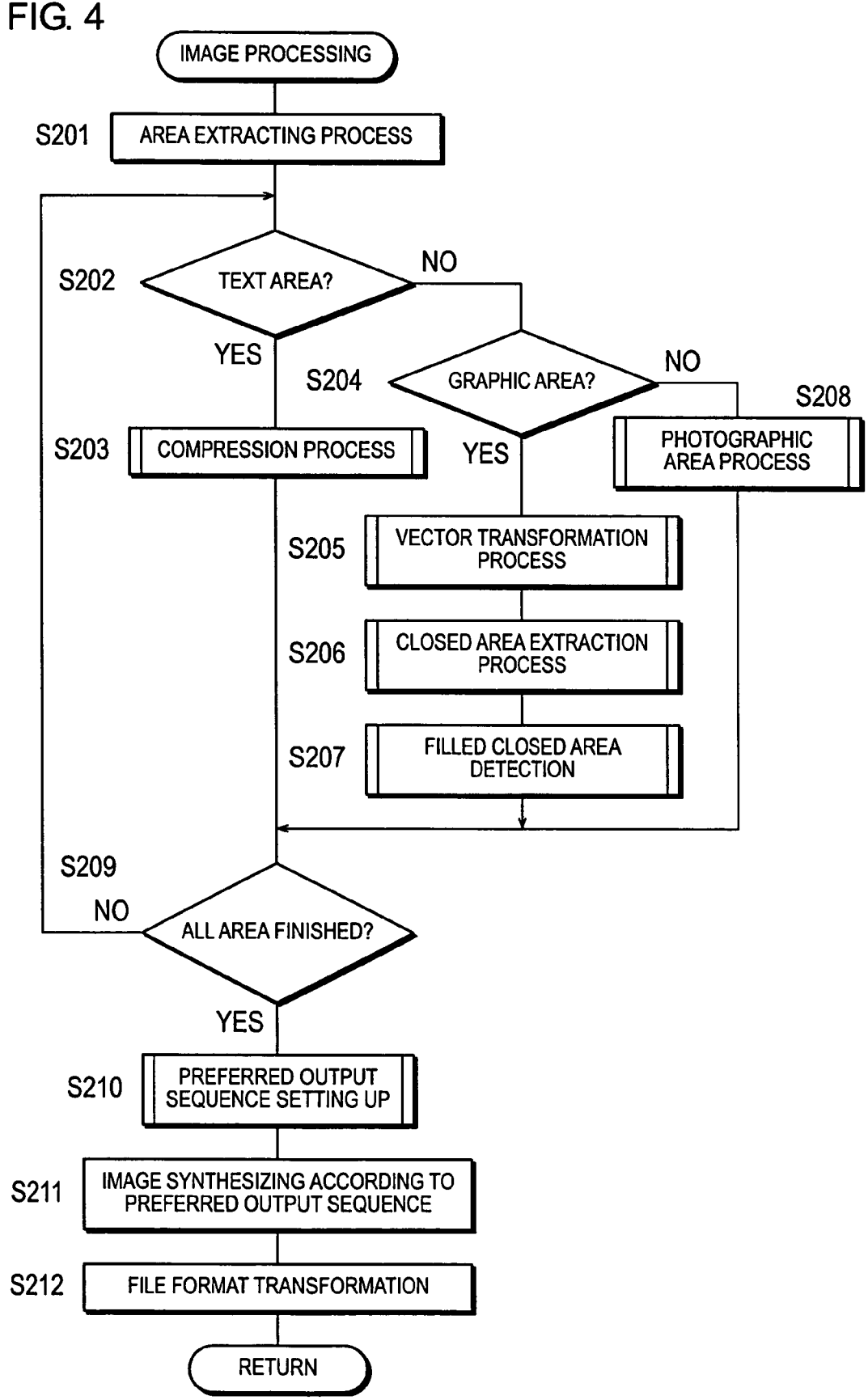
FIG. 4 is a flowchart showing the contents of the image processing shown in step S104 of FIG. 3.

Next, the contents of the image processing in step S104 of FIG. 1 will be described in detail referring to FIG. 4. FIG. 4 is a flowchart showing the contents of the image processing shown in step S104 of FIG. 3

First, text image areas, graphic image areas, and photographic image areas are separated and extracted respectively from the input image data (step S201). Thus, text image data, graphic image data, and photographic image data are obtained.

The text image areas are separated from the input image data by means of area separating part 106. The separated text image areas are then extracted by area extracting part 107. The text image data thus obtained is stored in storage unit 102 with the positional information of the area. Since the separation method for the text image area is no different from the prior art so that its detailed description is omitted here. For example, area separating part 106 extracts an area inside a circumscribing rectangle for an edge pixel group, whose spacing between the adjacent edge pixels of the edge image data obtained from image data is smaller than the specified number of pixels. The text area has a characteristic that it generally includes a large number of tilted edge components. Therefore, a text area can be identified and separated by calculating the tilted edge components among the frequency components included in an area inside a circumscribing rectangle as a characteristic value and evaluating the content of the tilted edge components. By complementing the text image constituting pixels extracted from the input image data with peripheral pixels, non-text image data can be produced from the input image data to be stored in storage unit 102.

The graphic image areas are separated from the above mentioned non-text image data by means of area separating part 106. The separated graphic image areas are then extracted by area extracting part 107. The graphic image data thus obtained is stored in storage unit 102 with the positional information of the area. A typical method of separating a graphic image area is to use the characteristic that a graphic image area has a generally uniform brightness distribution while the brightness distribution of a photographic image area is generally dispersed. In this case, a brightness histogram is prepared in order to calculate the degree of brightness dispersion as a characteristic value, so that graphic image areas can be separated from photographic image areas. In this case, a density histogram can be used instead of a brightness histogram. It is also possible to use the difference between a graphic image area and a photographic image area based on the black pixel rate information prepared by run length information and density histogram.

A photographic area can be extracted by area extracting part 107 from the image data after complementing the extracted graphic image constituting pixels with peripheral pixels. The photographic image data thus obtained is stored in storage unit 102 with the positional information of the area. Similar to the case of a text image area, a graphic image area and a photographic image area can also be assigned with an area inside a circumscribing rectangle of an edge pixel group as a data block respectively.

Figure 5:
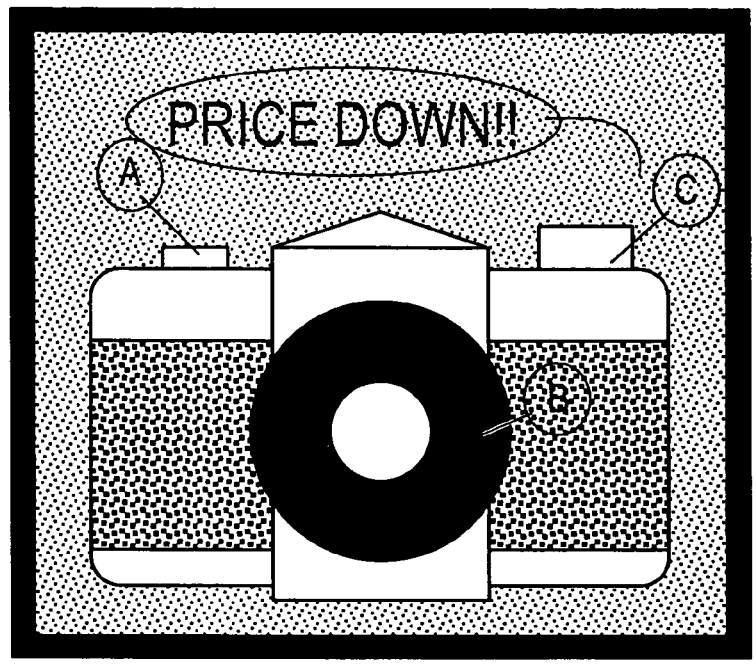
FIG. 5 is a diagram showing an example of input image data.
Figure 6:
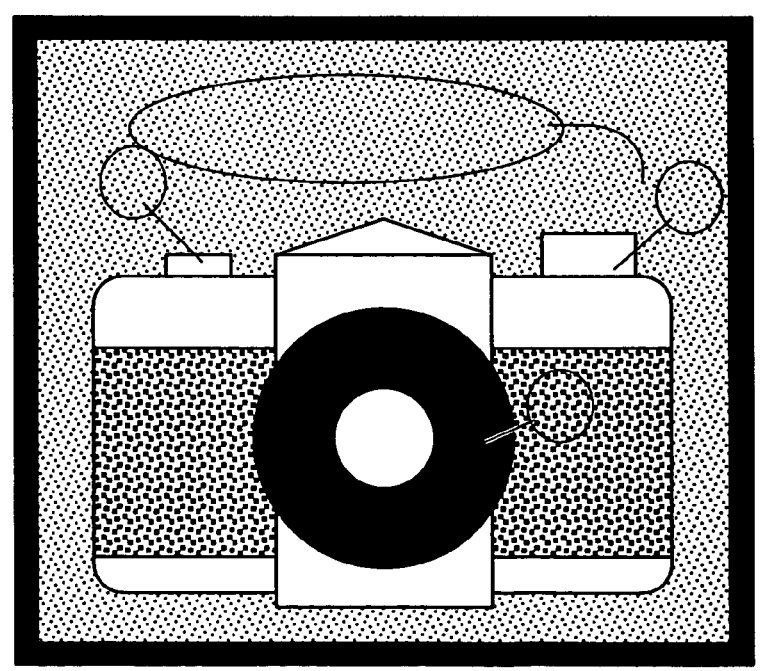
FIG. 6 shows non-text image data remaining after extracting text image areas from the input image data.

FIG. 5 and FIG. 6 show an example of area separation and extraction. FIG. 5 shows input image data and FIG. 6 shows non-text image data remaining after extracting a text image area from the input image data. For the simplicity of explanation, FIG. 5 and FIG. 6 show a case where the non-text image data is entirely a graphic image area and no photographic area exists. Therefore, the entire area of FIG. 6 is a graphic image area.

Next, each of these separated text image areas, graphic image areas, and photographic image areas is image processed individually as shown in FIG. 4 (S202 through S212 shown in FIG. 4). In other words, the text image data, graphic image data, and photographic image data are treated respectively with image processes appropriate to them.

When an area to be image processed is a text image area (S202: Yes), the text image data is binarized by means of text image processing part 108*a*. The reversible compression process for one bit data is applied to move it to storage unit 102 with color information and positional information (S203). It is also possible to recognize text images contained in a text image area and to transform them to text data (character codes such as the JIS code).

When an area to be image processed is a graphic image area (S204: Yes), a vector transformation process (e.g., raster vector transformation) is executed by means of graphic image processing part 108*b* (S205). The vector transformation process is a process of recognizing linear graphics (line segments and curves) contained in a graphic area, and transforms it into a vector data having line width information and expressed by the starting and ending points of the line. Next, the closed area extraction process is applied to the data transformed into vector data (S206). The closed area extraction process is to track the connecting conditions between multiple vector data in order to extract the closed area. When there is a closed area, this closed area extraction process extracts the closed area. Moreover, filled closed areas are detected from the extracted closed areas based on the color information to be added to vector data and the color information of the internal and external points of the closed area (S207). In other words, the attributes concerning whether the extracted closed area is a filled closed area or an unfilled closed area are identified in step S207.

A closed area is an area where a plurality of vector data are connected and closed. If the inside and outside of a closed area have common color information, this closed area is considered an unfilled closed area. On the other hand, if the inside and outside of a closed area have different color information, this closed area is considered a filled closed area. Also, an area occupied by vector data that does not constitute a closed area is considered a line area.

As mentioned above, if an area, which is an object of image processing, is a graphic image area (S204: Yes), a vector transformation process, a closed area detection process, and a filled closed area detection process are conducted, which will be described in detail later.

If an area, which is an object of image processing, is a photographic area (S204: No), preprocessing such as smoothing and edge enhancing will be applied to it by photographic processing part 108*c*. Further, a process including a binarization process such as the error dispersion method for reproducing original images with high fidelity may be applied to it (S208). Since the process for photographic image areas is the same as the prior art, detail description is omitted.

A judgment is made for each area as to whether all the processes corresponding to its image attribute (text, graphic and photographic) are completed (S209). If there are areas that have not been processed (S209: No), the process returns to step S202. On the other hand, if the process is completed all areas according to their attributes (S209: Yes), the process of step S210 and thereafter.

As to the process after step S210 and thereafter, first of all, it is detected whether there are any overlapping parts exist among areas separated and extracted according to the attributes such as text image areas, filled closed areas (graphic image areas), unfilled closed areas (graphic image areas), line areas (graphic image areas), and photographic image areas. For example, if each area is rectangular, it is possible to detect if there are any overlapping areas. For example, by comparing the two apex coordinates (e.g., left top and right bottom apex coordinates) on a diagonal line of each circumscribing rectangle. For example, if the left top and right bottom apex coordinates of an image area in question are (Xn, Yn) and (X'n, Y'n), and the left top and right bottom apex coordinates of an image area being compared are (Xm, Ym) and (X'm, Y'm), an overlapping area exists when a condition $Xn \leq X'm$, $X'n \geq Xm, Yn \geq Y'm$, and $Y'n \leq Ym$ is satisfied. In case of a line area, filled closed area, and unfilled closed area in a graphic image area, it is possible to determine if there is any overlapping area exists based on the vector data value, even if the particular area is not a rectangular area.

Next, the overlaying sequence for image areas is set up (S210). Although a more detailed description will be made later, it can be briefly described that the overlaying sequence is set up in such a way that an unfilled closed area is placed in front of a filled closed area.

After the overlaying sequence is set up in step S210, a file is produced according to the internal file format by placing and synthesizing each image area data in accordance with the overlaying sequence set up in step S210 and in accordance with each positional information (S211).

Furthermore, after the file making process in Step S211 is completed, the file according to the internal format is transformed into the preset output file format (e.g., PDF) by file format transformation part 110 (S212). The output file thus obtained is transmitted to file server 3 via output interface 105 and network 4.

Upon receiving a file from image processing device 1 via network 4, file server 3 stored the received file in the specified directory of a storage unit such as a hard disk. When file server 3 receives a transfer request for the file from other equipment on network 4, file server 3 transfers the stored file to the other equipment via network 4.

As can be seen from the above, the image processing device of the present embodiment executes such processes as vector transformation, closed area extraction, detection of filled closed area, and setting of overlaying sequence. In the following each of these processes will be described.

(Vector Transformation Process)

Figure 7:
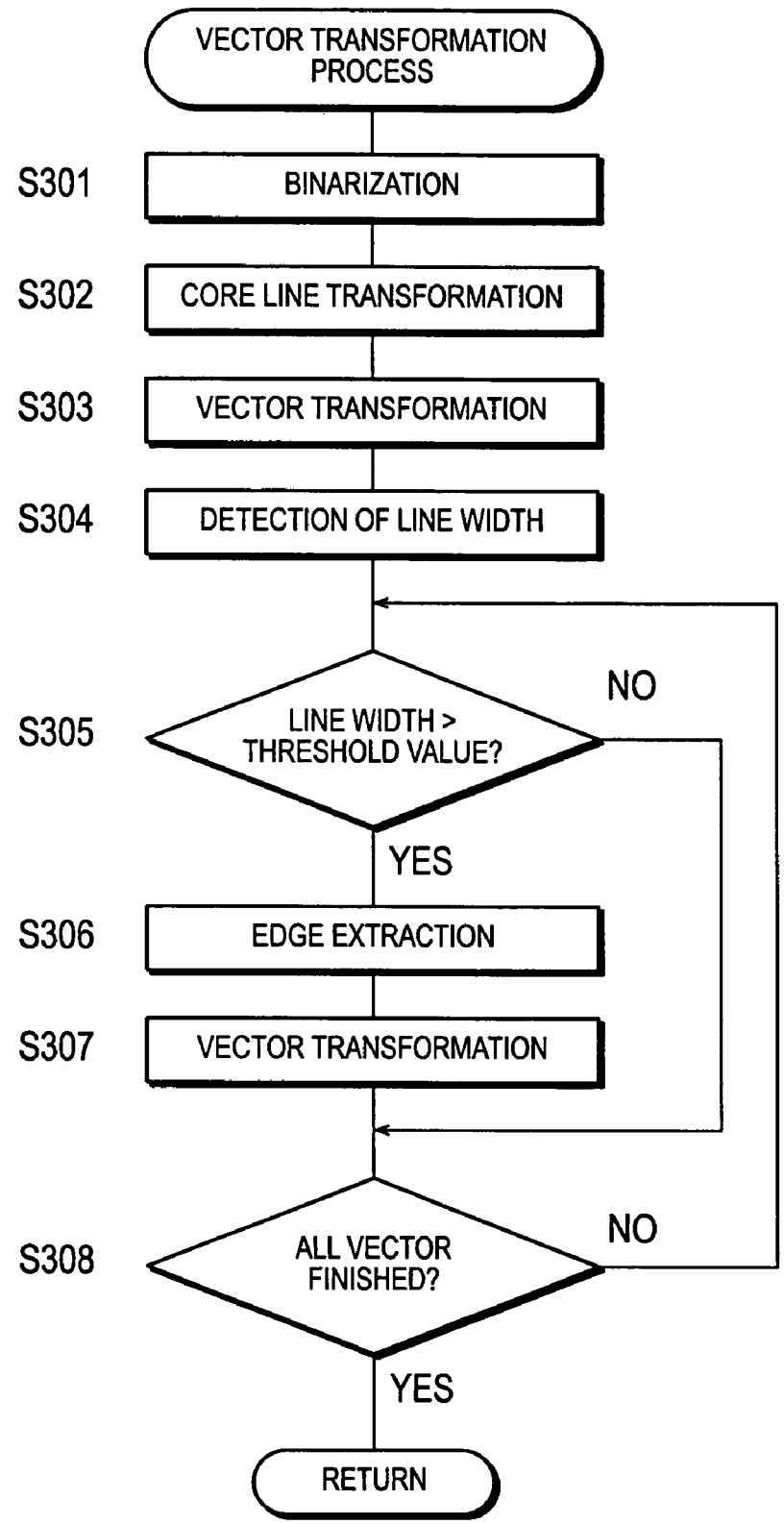
FIG. 7 is a flowchart showing the contents of a vector transformation process shown in step S205 of FIG. 4.

FIG. 7 is a flowchart showing the contents of the vector transformation process shown in step S205 of FIG. 4. The flowchart shown in FIG. 7 is a subroutine of the flowchart shown in FIG. 4.

First, graphic image processing part 108b binarizes the graphic image data in a graphic image area (S301). The centerline of line width 1 called the core line is extracted from the image data obtained by the binarization process (hereinafter called "binarized image") (S302). The graphic image processing part 108b transforms this core line into a vector data expressed by the coordinates of the starting and ending points (S303). In this case, the curvilinear part is expressed in approximation in such forms as a Bezier curve or spline curve.

Next, the line width of the vector data thus obtained is detected (S304). The detection of the line width is executed by statistically processing the data obtained during each processing such as extraction process of the core line (S302) and the transformation process into the vector data (S303). For example, the line width can be defined as a value obtained by calculating the average distance between the edge pixel and the core line of the linear graphic and multiplying it by two. The line width information is added to the vector data of the corresponding linear graphic.

Next, one vector data is selected from all the vector data obtained. By comparing the line width added to the selected vector data and the predetermined threshold value, it is determined whether the line width is larger than the threshold value (S305). This process of step S305 is for determining whether linear graphics should be treated as lines or areas. If the line width is larger than the threshold value (S305: Yes), it is determined that the linear graphic corresponding to the selected vector data be treated as an area not as a line. Therefore, the edge detection is applied to the linear graphic again (S306), and the edge data thus obtained is transformed to the vector data (S307). On the other hand, if the line width is smaller than the threshold value (S305: No), it is determined that the linear graphic that corresponds to the selected vector data can be treated as a line. Therefore, the process of step S308 and thereafter follows immediately.

The vector transformation process ends when the abovementioned comparison process of step S305 is completed for all vector data (S308: Yes). The process then returns to the flowchart of FIG. 4 and moves on to the close area extraction process.

(Closed Area Extraction Process)

Figure 8A:
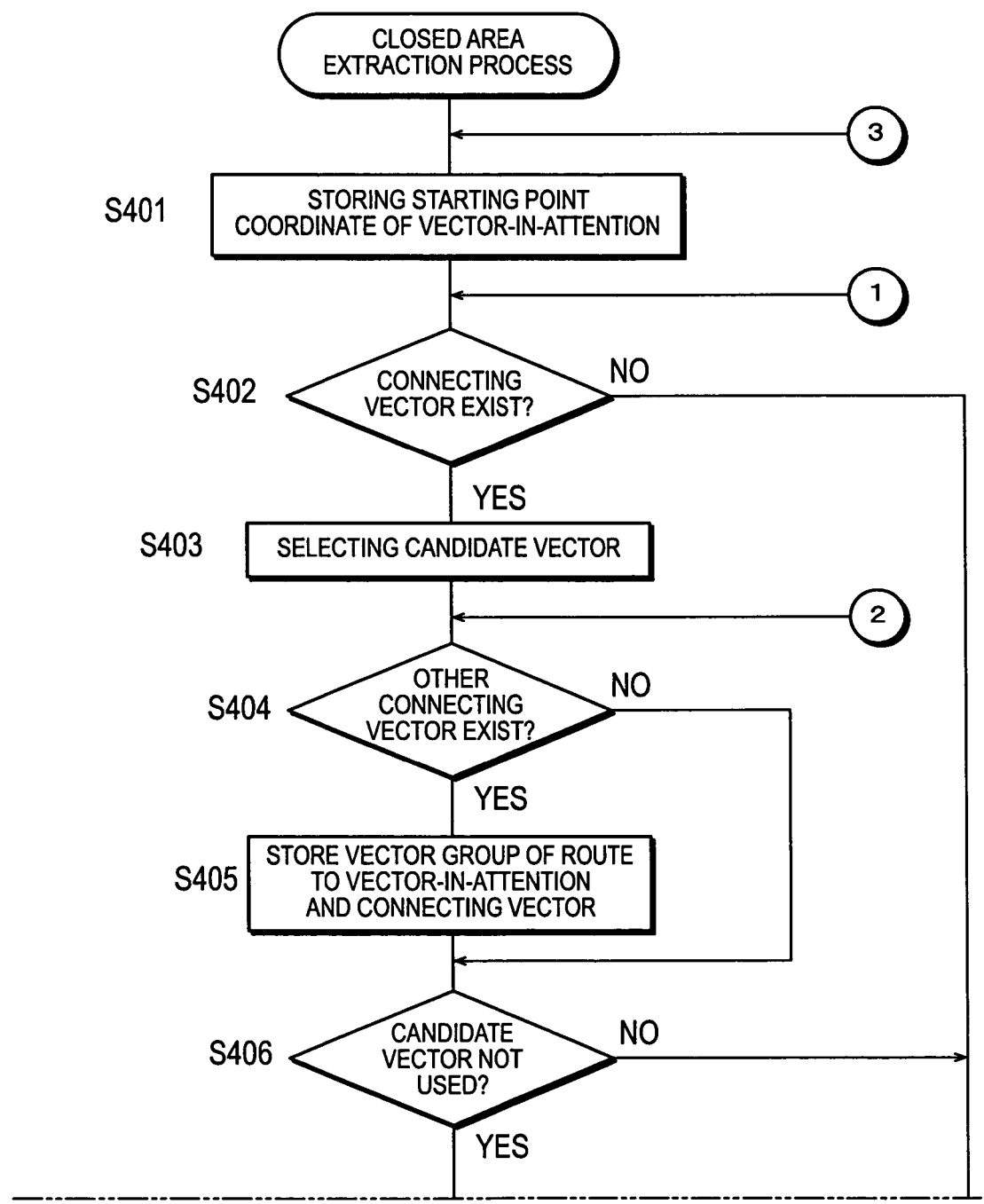
FIGS. 8A and 8B are flowcharts showing the contents of a closed area extraction process shown in step S206 of FIG. 4.
Figure 8B:
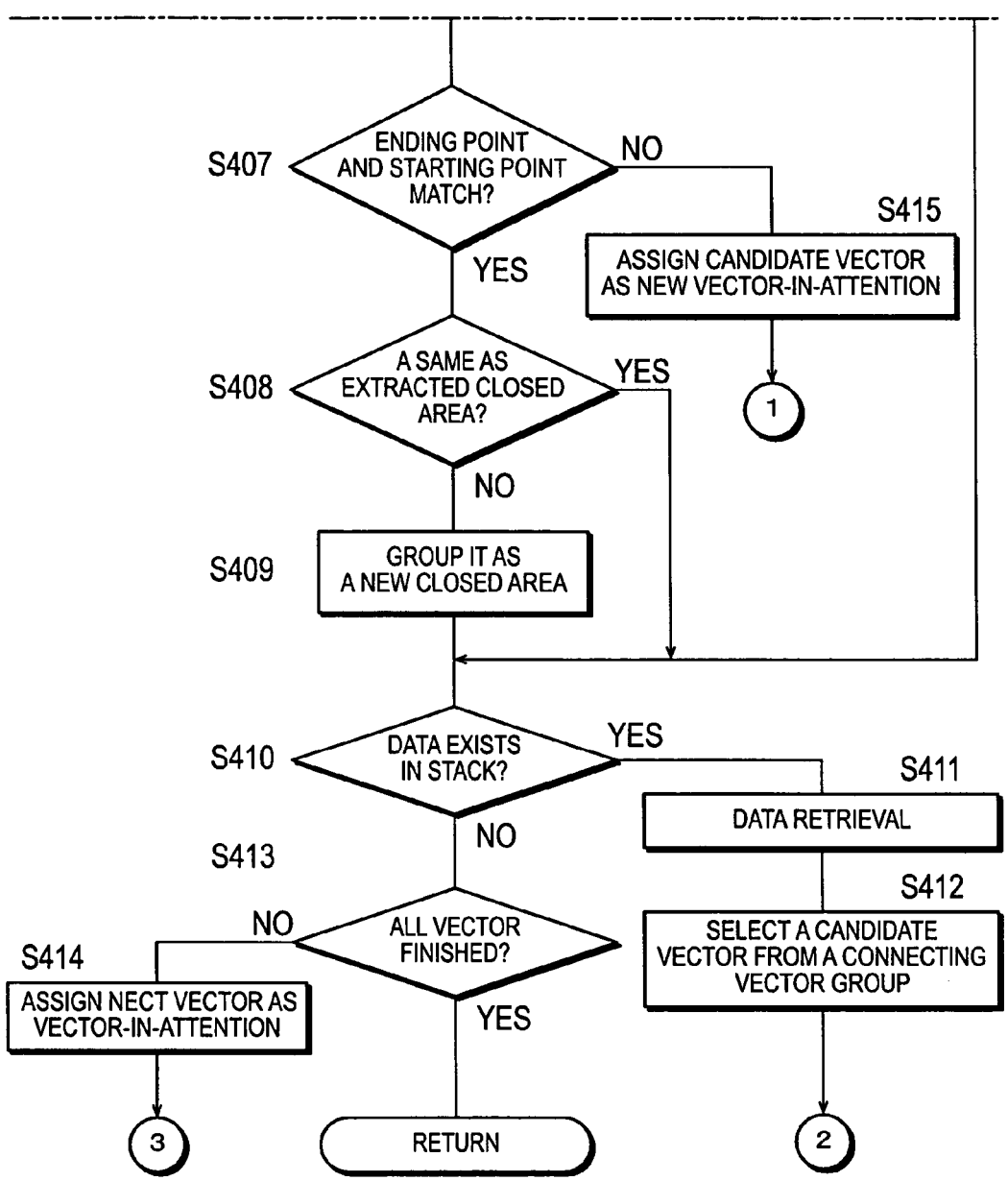

FIGS. 8A and 8B are flowcharts showing the contents of the closed area extraction process of FIG. 4. The flowcharts shown in FIGS. 8A and 8B are subroutines of the flowchart shown in FIG. 4.

Fist, the starting point coordinate of the vector data in attention (hereinafter "vector data" will be called as "vector" for the sake of brevity) is stored in storage unit 102 (S401). The vector-in-attention that is accompanied with the storage of the starting point coordinate as in step S401 is defined as the initial vector-in-attention. Next, if vectors that connect with the ending point of the vector-in-attention (hereinafter called "connecting vectors") exist (S402: Yes), a candidate vector is selected from the group of connecting vectors (S403).

If there are connecting vectors other than the candidate vector (S404: Yes), the connecting vectors other than the candidate vector (generally the connecting vector group) are preferably stored in a stack specified inside storage unit 102 together with the vector group that indicates the route to the current vector-in-attention (S405). This is to prevent that the extraction of the closed area from becoming impossible to be extracted due to vector branching.

Next, on the condition that the abovementioned candidate vector has not been used so far (S406: Yes), a judgment is made whether the ending coordinate of the candidate vector coincides with the starting coordinate stored in the abovementioned step S407 shown FIG. 8B.

If the ending point coordinate of the candidate vector does not coincide with the abovementioned starting coordinate (S407: No), this candidate vector becomes a new vector-in-attention (S415). When the process returns to step S402, and the next candidate vector is selected from the connecting vector group that connects with the ending point of the new vector-in-attention (S403), and the same process is repeated.

On the other hand, if the ending coordinate of the candidate vector coincides with the starting coordinate (S407: Yes), it means that the vector group that starts from the starting coordinate and returns to the starting coordinate exists and that a closed area is detected. In this case, on the condition that this closed area is not the same as the closed area already extracted and formed a group (S408: No), the detected vector group will be grouped as a new closed area (S409).

Moreover, a judgment is made whether there is any other data is stored in the stack (S410). If there is no other vector that connects with the ending point of the vector-in-attention, i.e., there is no connecting vector (S402: No), the candidate vector has been used (S406: No), and a closed area identical to the closed area, which has been grouped (S408: Yes), the contents of the stack at that point are confirmed and a judgment is made as to whether any data is stored in the stack (S410).

If it is judged that some data is stored in the stack (S410: Yes), the data will be retrieved from the stack (S411). A candidate vector is selected from the connecting vector group inside the stack (S412), and the process returns to step S404. On the other hand, if not data is stored in the stack (S410: No), it is judged that all the data stored in the stack are searched and the process advances to step S413.

If the extraction of closed areas is not completed for all the vectors contained in the vector group obtained by the process of FIG. 7 (S413: No), next one vector will be selected from the vector group as the new initial vector-in-attention (S414). It then returns to step S401 and the similar process will be repeated. If the extraction of closed areas is completed for all the vectors (S413: Yes), the closed area extraction process will be completed and the process returns to the flowchart of FIG. 4.

Figures 9, 10:
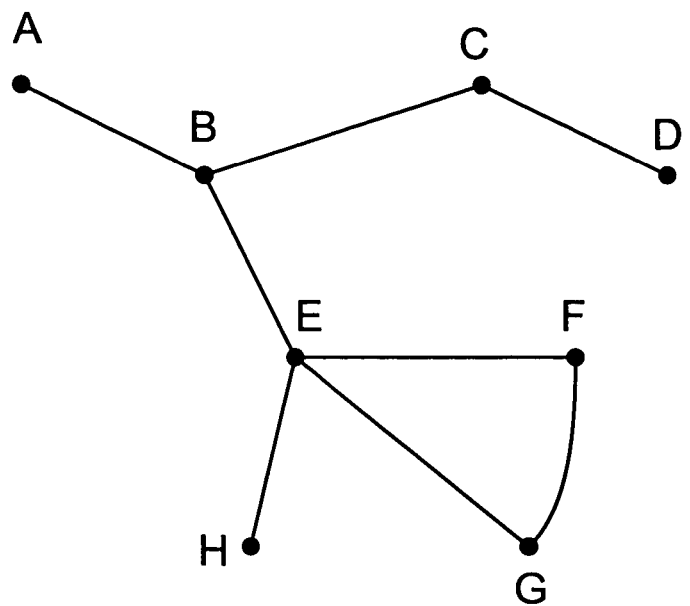

FIG. 9 is an example of a vector group, and FIG. 10 through FIG. 14 show data stored in stacks. In FIG. 9, for example, a vector AB is selected as the initial vector-in-attention. In this case, the coordinate of starting point A is stored in storage unit 102 (S401).

In a status shown in FIG. 10, a candidate vector BC is selected from the connecting vector group that connects with the ending point B of vector-in-attention AB. The other connecting vector group (vector BE) is stored in the stack.

In a status shown in FIG. 11, the process is in a stage more advanced from FIG. 10, and the vector-in-attention is now vector BE. A candidate vector EF is selected among the connecting vector group connected to the ending point E of the vector-in-attention BE. Other connecting vector groups (vectors EG, EH) are stored in the stack together with the vector group (vectors AB, BE) that indicates the route to the vector-in-attention BE.

In a status shown in FIG. 12, the process is in a stage more advanced from FIG. 11, and the vector-in-attention is now vector GE. Candidate vector EB is selected among the connecting vector group connected to the ending point E of the vector-in-attention GE. Other connecting vector groups (vectors EF, EH) are stored in the stack together with the vector group (vectors AB, BE, EF, FG, GE) that indicates the route to the vector-in-attention GE.

FIG. 13 shows a status, which is further advanced from the status of FIG. 12. Since the candidate vector EB in the status of FIG. 12 has already been used in the route (S406: No), the next candidate vector EF is selected from the data stored in the stack, and the remaining connecting vector group (vector EH) is stored in the stack together with the vector group (vectors AB, BE, EF, FG, GE) that indicates the route to the vector-in-attention GE.

Figures 14, 15:
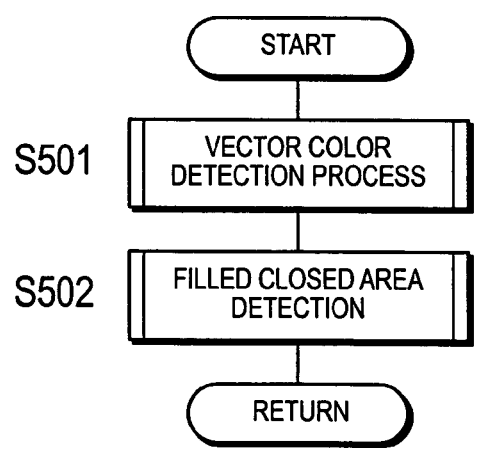

In a status shown in FIG. 14, the process is in a stage more advanced from FIG. 13, and the vector-in-attention is now back to vector BE. Vector EG is selected as the next candidate from the data stored in the stack, and the remaining connecting vector group (vector EH) is stored in the stack together with the vector group (vectors AB, BE) that indicates the route to vector-in-attention BE.

In a status further advanced from the status of FIG. 14, the candidate vector EG cannot be a vector-in-attention since it has been used in the previous route (S406: No), vector EH is selected as a candidate vector from the stack. However, this vector EH cannot be a vector-in-attention as it has already been used (S406: No). At this point, the stack is empty so that the process that started with vector AB as the initial vector-in-attention ends. Then, another vector is selected as the initial vector-in-attention from the vector group shown in FIG. 9, and a similar process is repeated.

When the closed area extraction processes are executed sequentially from the remaining each vector, a closed area EFG is detected when the initial vector-in-attentions are vector EF, vector FG and vector EG. However, it is grouped as a closed area (S409) only when it is detected for the first time (S408: No). The vector data that were not grouped as closed areas are judged as line areas, and added with an attribute as a line area.

When the abovementioned closed area extraction process is completed, the process returns to the flow chart of FIG. 4, and advances to the next process of determining whether the area is a filled closed area or an unfilled closed area.

(Detection of Filled Closed Areas)

FIG. 15 is a flowchart showing the contents of the detection process of the filled closed area shown in FIG. 4. The flowchart shown in FIG. 15 is a subroutine of the flowchart shown in FIG. 4.

First, the vector color detection process is executed in order to detect the color of a vector (S501). The contents of the vector color detection process in step S501 will be described below referring to FIG. 16.

Figure 16:
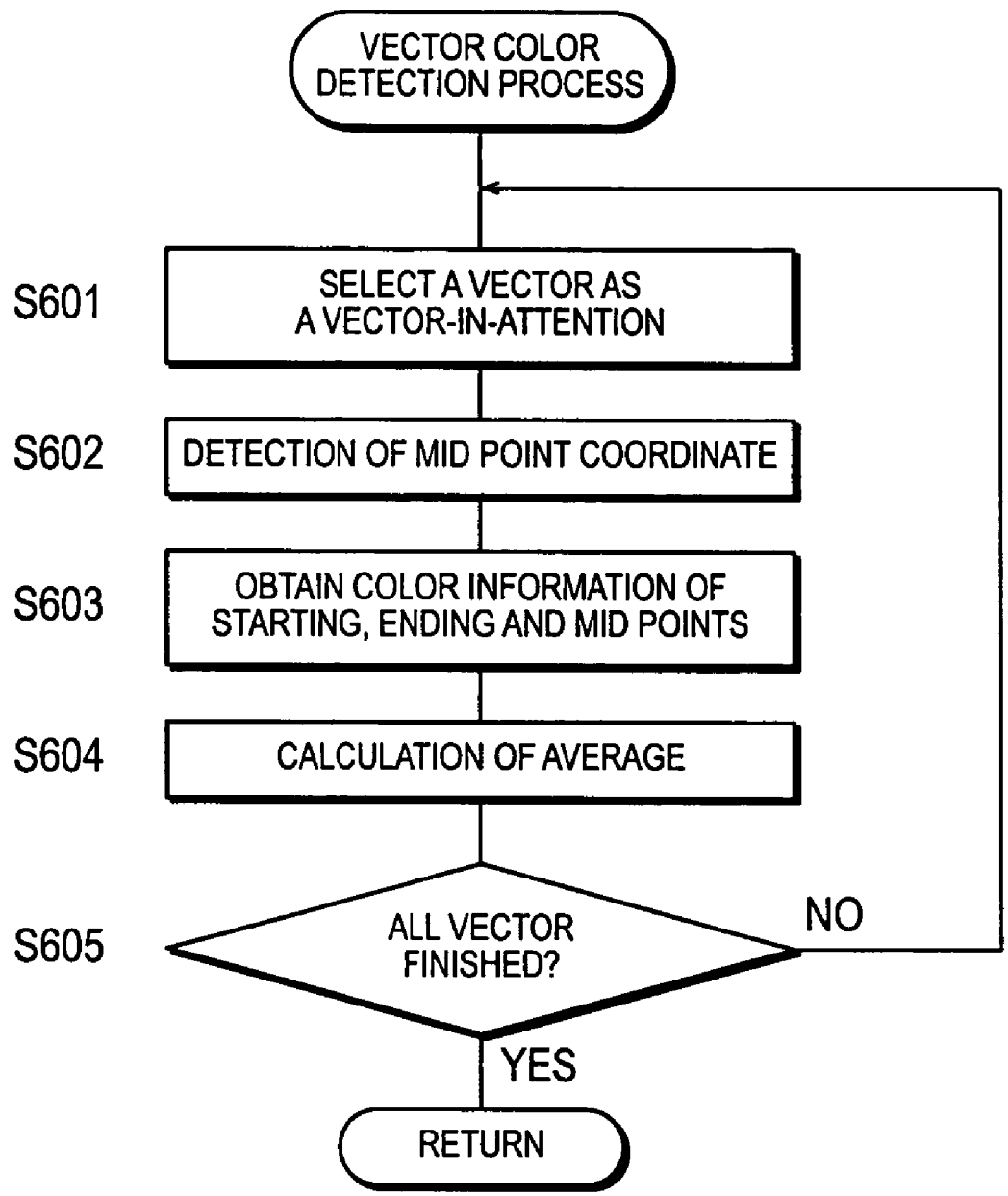
FIG. 16 is a flowchart showing the contents of a process shown in step S501 of FIG. 15.

FIG. 16 is a flowchart showing the contents of the vector color detection process shown in step S501 of FIG. 15. First, all the vectors obtained in the process in step S205 of FIG. 4, i.e., the vector transformation process shown in FIG. 7 are retrieved from storage unit 102. The vector includes the coordinates of the starting point and the ending point as mentioned above, and the information about the line width is also attached at this stage.

One vector-in-attention is selected from these vectors (S601). The coordinate of the mid point of the vector is calculated from the starting point coordinate and the ending point coordinate of the vector-in-attention (S602). The color information (RGB, CMYK, L*a*b, etc.) for the three point positions that correspond to these starting, end and mid points is obtained from the input image data (S603). The average of the color information for the starting, end and mid points thus obtained is calculated (S604). The average value thus obtained is defined as the color of the vector.

A judgment is made then as to whether the color detection for all vectors is completed (S605). If the color detection for all the vectors is not completed (S605: No), the process returns to step S601 and the next vector is selected as the vector-in-attention and the similar process is repeated. On the other hand, if the color detection is completed for all the vectors (S605: Yes), the vector color detection process ends and the process advances to step S502 of FIG. 15.

Next, the detection process of filled closed area will be executed in step S502 in FIG. 15. The contents of the detection process of filled closed area of step S502 will be described below using FIG. 17.

Figure 17:
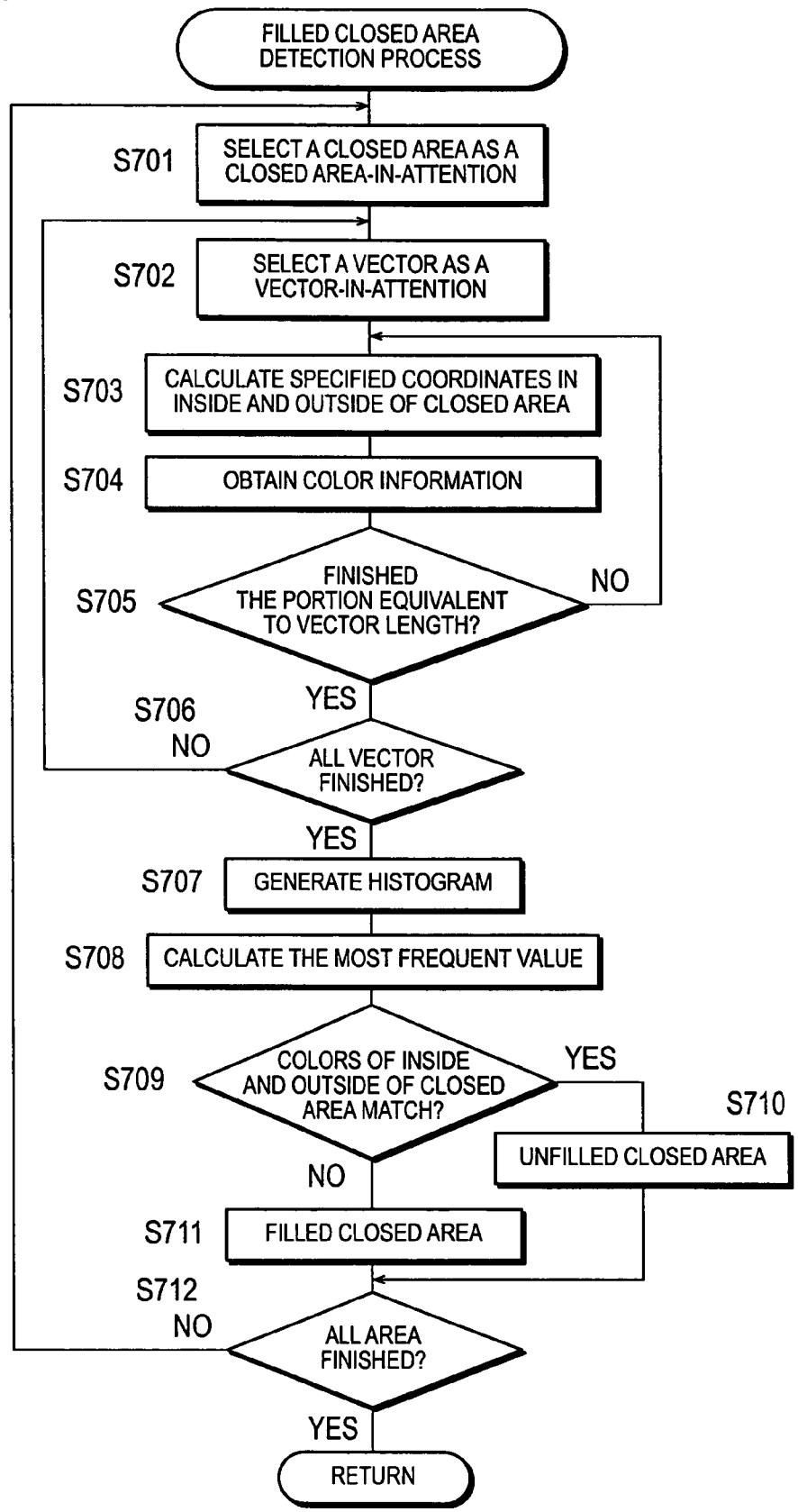
FIG. 17 is a flowchart showing the contents of a process shown in step S502 of FIG. 15.

FIG. 17 is a flowchart showing the contents of the detection process of the filled closed area in step S502 shown in FIG. 15.

First, all the vector groups grouped in step S206 of FIG. 4, i.e., the closed area extraction process shown in FIGS. 8A and 8B, are retrieved from storage unit 102.

A closed area consisting of a single vector group is selected as a closed area-in-attention (S701). In addition, one vector is selected as a vector-in-attention from the vector group that constitutes this closed area (S702). The specified coordinate values of the internal and external of the closed area will be calculated (S703). More specifically, the coordinates of points existing on the inside of the closed area (hereinafter called "internal points"), inside by the amount of {(line width/2)+a} dots, and the points existing on the outside of the closed area (hereinafter called "external points"), outside by the amount of {(line width/2)+a} dots, relative to the center axis, which is the vector-in-attention selected from the vector group constituting the closed area-in-attention. The color information (RGB, CMYK, L*a*b, etc.) for the positions that correspond to these internal and external points is obtained from the input image data (S704).

A judgment is then made as to whether the color information acquisition is completed concerning the internal and external points equivalent to the length of the vector-in-attention, more specifically the internal and external points that are determined according to the length of the vector-in-attention (S705). The system waits for the acquisition of the color information for the internal and external points equivalent to the length of the vector-in-attention (S705: Yes), and makes a judgment whether the process is completed for all the vectors that constitute the closed area-in-attention (S706). If there are any vectors left that have not been selected (S706: No), the process goes back to step S702, and the next vector-in-attention will be selected. On the other hand, if the process is completed for all the vectors constituting the area-in-attention (S706: Yes), a histogram will be generated concerning each color information for the internal and external points equivalent to the length of the vector obtained respectively for all the vectors constituting the area-in-attention (S707).

Next, the value of the color information with the highest frequency of appearance in the histogram prepared for each of the internal and external points (S708). The color information thus obtained provides the color information of the inside of the closed area and the color information of the outside of the closed area respectively. The color information of the inside of the closed area is compared with the color information of the outside of the closed area and a judgment is made here whether they are the same (S709). If the color information of the inside is judged to be the same as the color information of the outside (S709: Yes), it is judged that this closed area is an unfilled closed area. In this case, attribute information that it is an unfilled closed area is added to this closed area in question (S710). On the other hand, if the color information of the inside is judged to be different from the color information of the outside (S709: No), it is judged that this closed area is a filled closed area. In this case, attribute information that it is a filled closed area is added to this closed area in question (S711).

Next, a judgment is made whether the process is completed for all the closed area (S712). If there are any closed areas left that have not been processed (S712: No), the process goes back to step S701, the system selects the next closed area as the area-in-attention, and repeats the process of step S701 and thereafter.

On the other hand, if the process is completed for all the closed areas (S712: Yes), the process returns to the flow chart of FIG. 4.

Figure 20:
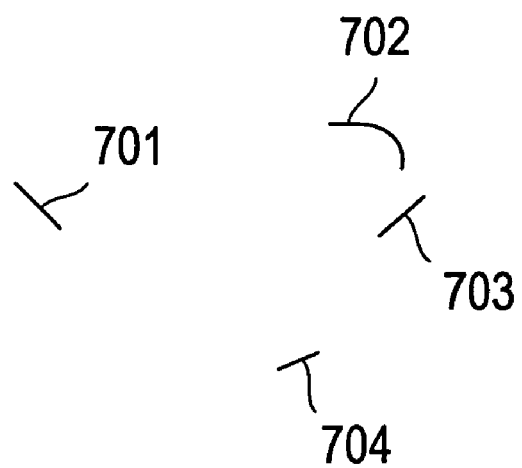
FIG. 20 is a diagram showing line areas extracted from the input image data extracted from FIG. 5.
Figure 21:
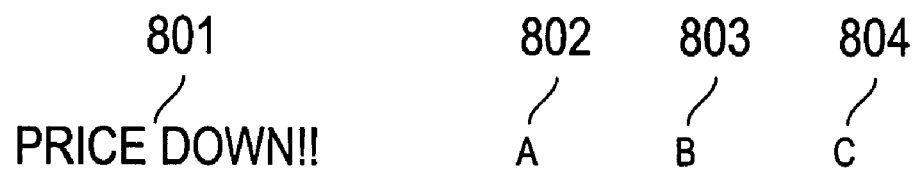
FIG. 21 is a diagram showing text image areas extracted from the input image data extracted from FIG. 5.

FIG. 18, FIG. 19, FIG. 20 and FIG. 21 show the examples of unfilled closed areas (graphic areas), filled closed areas (graphic areas), line areas (graphic areas), and text image areas, which are all separated from the input image data shown in FIG. 5 through the processes described above. As mentioned before, the input image data shown in FIG. 5 does not include any photographic image area. FIG. 18 shows unfilled closed areas (graphic image areas) 501 through 504. FIG. 19 shows filled closed areas (graphic image areas) 601 through 614. FIG. 20 shows line areas (graphic image areas) 701 through 704. FIG. 21 shows text image areas 801 through 804.

When the detection process for filled closed areas is completed as described above, the process advances to the overlaying sequence setting process.

(Overlaying Sequence Setting Process)

Figure 22:
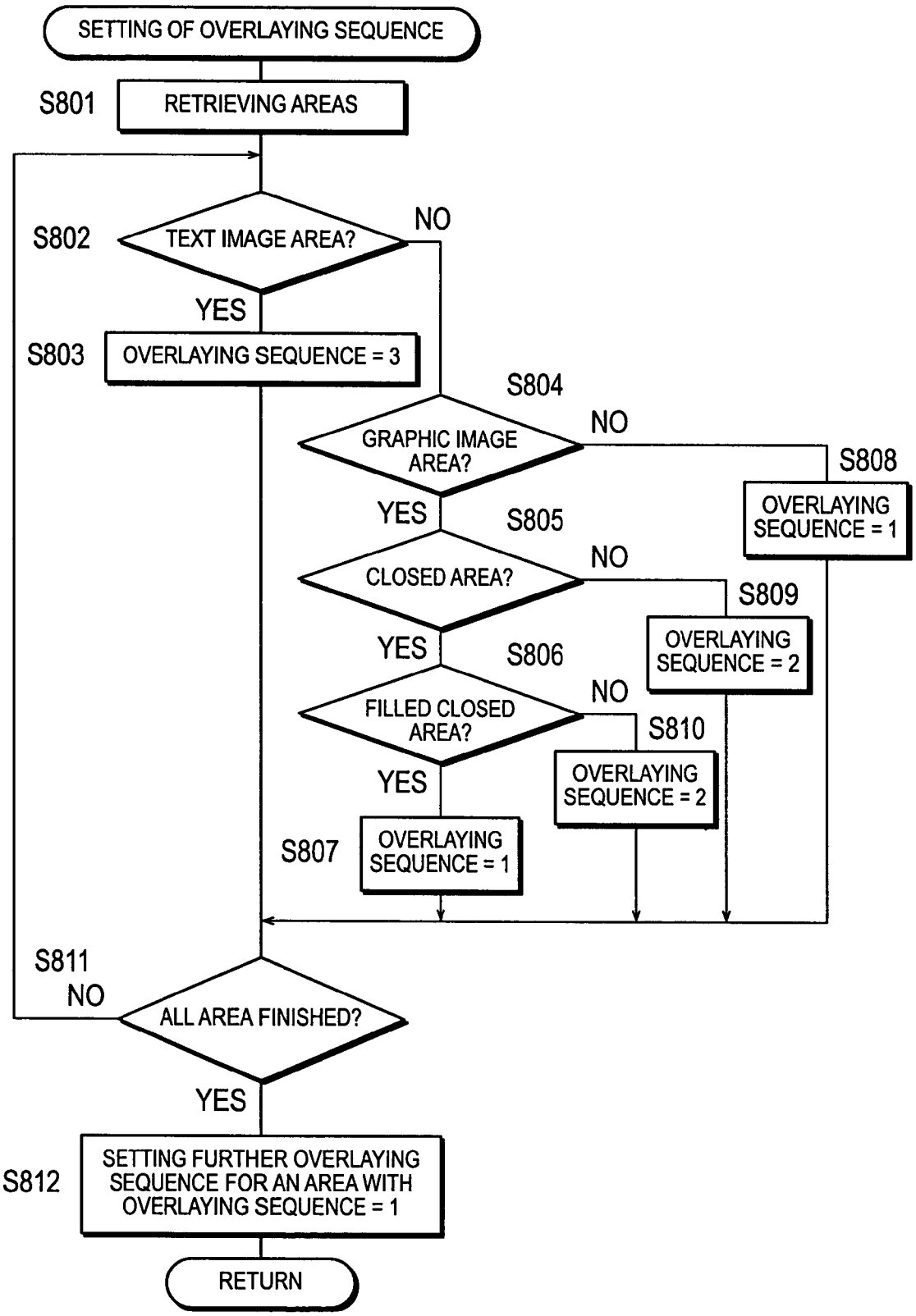
FIG. 22 is a flowchart showing the contents of a overlaying sequence setting process shown in step S210 of FIG. 4.

FIG. 22 is a flowchart showing the contents of an overlaying sequence setting process shown in step S210 of FIG. 4. The flowchart shown in FIG. 22 is subroutine of the flowchart shown in FIG. 4.

First, the areas attached with attributes are retrieved (S801), and the attributes are judged (S802, S804, S805, and S806). A judgment is made in step S802 as to whether the retrieved area is a text image area. If it is found to be a text image area (S802: Yes), the overlaying sequence is set to "3" (S803). The overlaying sequence is the order of placement in displacing each image area to its original position in the file synthesizing production process to be described later. Therefore, in an area where a plurality of image areas are to be overlaid, the smaller the number of overlaying order, the image area is placed further backward, while the larger the number of overlaying order, the image area is placed further forward in the synthesizing process. In other words, the smaller the number of overlaying order, the earlier the area is outputted. Specifically, the area of the overlaying order "2" is outputted after the area of the overlaying order "1" in step S211 of FIG. 4, and the area of the overlaying order "3" is outputted after the area of the overlaying order "2."

The overlaying sequences of text image areas 801 through 804 shown in FIG. 21 are set to "3" in step S803. On the other hand, if the area retrieved is not a text image area (S802: No), a judgment is made as to whether the retrieved area is a graphic image area (S804). If it is found to be not a graphic image area (S804: No), the overlaying sequence is set to "1" as a photographic image area (S808).

On the other hand, if it is judged to be a graphic image area (S804: Yes), a judgment is further made as to whether it is a closed area (S805). If it is found to be not a closed area (S805: No), the overlaying sequence is set to "2" (S809). The overlaying sequences of line areas 701 through 704 shown in FIG. 20 are set to "2." On the other hand, if it is judged to be a closed area (S805: No), a judgment is further made as to whether it is a filled closed area (S806). If it is a filled closed area (S806: Yes), the overlaying sequence is set to "1." The overlaying sequences of filled closed areas 601 through 614 shown in FIG. 19 are set to "1." On the other hand, if the closed area is an unfilled closed area (S806: No), the overlaying sequence is set to "2" (S810). The overlaying sequences of unfilled closed areas 501 through 504 shown in FIG. 18 are set to "2."

Next, a judgment is made as to whether the processes of steps S801 through S810 are completed for all the areas (S811). If there are areas where the overlying sequences are not set up (S811: No), the process returns to step S801, retrieves the next area and repeats the same processes (S801 through S810).

On the other hand, if the overlaying sequence is completed for all the areas (S811: Yes), the setting process for further detailed overlaying sequence will be executed for a plurality of areas for which the overlaying sequences are set to "1" (S812).

If it is a filled closed area (S806: Yes), or a photographic image area (S804: No), the overlaying sequence is set to "1." There are cases here wherein a filled closed area and a photographic image area are overlapping each other, so that it is impossible to reproduce the original image faithfully depending on the overlaying sequence. Therefore, it is preferable to conduct a finer sequencing among the areas where the overlaying sequence is set to "1."

For example, if a plurality of areas are overlapping, the size of area is compared or the number of overlapping areas is calculated depending on the numerical integration based on the coordinates of the apexes of the abovementioned circumscribing rectangles and vector data values (valued of the starting and ending points). Furthermore, as a result of these calculations, a finer sequencing can be set among the areas where the overlapping order is set to "1." The finer overlaying sequence thus set up can be expressed using a decimal point. Specifically, the overlaying sequence can be set using the decimal point expression such as "1.01", "1.02", . . . "1.99."

When the above process is completed, the overlaying sequence setting process ends and the system returns to the process of FIG. 4. Next, each image area is laid out and synthesized to the specific position based on the respective positional information in accordance with the overlying sequence by file producing part 109 in step S211 shown in FIG. 4. Consequently, the file is produced in accordance with the internal file format. This is as described in the above.

Specifically, the areas whose overlaying sequences are "1," i.e., filled close areas 601 through 614 shown in FIG. 19 are laid out first. Next, the areas whose overlaying sequences are "2.", i.e., unfilled closed areas 501 through 504 shown in FIG. 18, as well as line areas 701 through 704 shown in FIG. 20 are laid out. Lastly, the areas whose overlaying sequences are "3.", i.e., text image areas 801 though 804 shown in FIG. 21 are laid out. Consequently, filled closed areas 601 through 614 end up being laid out behind unfilled closed areas 501 through 504 and line areas 701 through 704. As a result, filled closed areas will never cover up unfilled closed areas and line areas. Moreover, text image areas will never cover up filled closed areas in this embodiment.

Although the above description was based on a particular embodiment, the invention shall not be limited by such a description, and it is obvious that a person skilled in the art can make various omissions, additions, or changes to it within the scope of the invention.

The image processing method of this invention can be applied to various kinds of image forming equipment such as image scanning devices such as scanners, computers such as personal computers, workstations, and servers, digital copying machines, facsimile machines and other multifunctional peripheral equipment (MFP).

The image processing device and the method of image processing according to this invention can be realized by a dedicated hardware circuit for executing the abovementioned steps, or by causing a CPU to execute a computer program where these steps are described. In case of realizing this invention by means of a computer program, the specified program for operating the image processing device can be provided by a computer readable recording medium such as a flexible disk or a CD-ROM, or can be provided on line by means of a network such as the Internet. In this case, the program recorded on a computer readable recording medium is normally transferred to and stored on a ROM, hard disk or other storage units. The program can also be provided as independent application software or can be built into the software of the image processing device as a part of it.

What is claimed is

1. An image processing device comprising:
   an image area extracting part for extracting a plurality of image areas from image data;
   a positional information recognizing part for recognizing positional information of each extracted image area;
   an attribute recognizing part for recognizing at least attributes concerning whether each extracted image area is a filled closed area, wherein the closed area has an inside of which a color has different value from an outside of the closed area, common stays or an unfilled closed area, wherein the closed area has an inside of which a color has same value from an outside of the closed area;
   a file producing part for producing a file by synthesizing said image areas based on the positional information recognized by said positional information recognizing part; and
   a sequence setting part for setting up an overlaying sequence for each image area in accordance with the recognition result of said attribute recognizing part,
   wherein said file producing part produces the file by overlaying said image areas in accordance with the overlaying sequence set up by said sequence setting part.

2. An image processing device according to the claim 1, wherein said sequence setting part sets up the overlaying sequence to overlay unfilled closed areas in front of filled closed areas.

3. An image processing device according to the claim 2, wherein said attribute recognizing part further recognizes whether each extracted image area is a line area that does not form any closed area, and
   said sequence setting part sets up the overlaying sequence to overlay line areas in front of filled closed areas in accordance with the recognition result of said attribute recognizing part.

4. An image processing device according to the claim 1, wherein said image area extracting part comprises a first extracting part for extracting text image areas, graphic image areas, and photographic image areas from image data, and a second extracting part for extracting filled closed areas, unfilled closed areas, and line areas that do not form any closed areas from the extracted graphic image areas;
   wherein said attribute recognizing part recognizes attributes concerning whether each extracted image area is a text image area, a photographic image area, a filled closed area, an unfilled closed area or a line area; and
   said sequence setting part sets up the overlaying sequence for each image area of text image areas, photographic image areas, filled closed areas, unfilled closed areas, and line areas in accordance with the recognition result of said attribute recognizing part.

5. An image processing device according to the claim 4, wherein said sequence setting part sets up the overlaying sequence to overlay text image areas in front, filled closed areas and photographic image areas in back, and unfilled closed areas and line areas in between the front and back.

6. An image processing device according to the claim 5, further comprising an image area overlapping discriminating part for discriminating whether at least a part of either filled closed areas or photographic image areas are overlapping each other;
   wherein said sequence setting part further sets up an overlaying sequence for filled closed areas and photographic image areas, depending on the result of a comparison of the sizes of filled closed areas and photographic image areas, or the number of overlapping areas, when at least some of the filled closed areas and photographic image areas are overlapping.

7. An image processing device according to the claim 4, wherein said second extracting part comprises,
   a vector transforming part for transforming image data in graphic image areas into vector data;
   a closed area extracting part for extracting closed areas based on the connection relation of a plurality of vector data;
   a color information judging part for judging whether the color information of internal points and external points of the extracted closed areas are the same; and
   a filled closed area detecting part for detecting filled closed areas based on the judgment results of the color information judging part.

8. An image processing device according to the claim 1, further comprising a document scanning unit for scanning documents to obtain input image data,
   wherein said image area extracting part extracts a plurality of image areas from the input image data obtained by scanning the documents.

9. An image processing method comprising: using a processor to perform steps of:
   extracting a plurality of image areas from image data;
   recognizing positional information of each extracted image area;
   recognizing at least attributes concerning whether each extracted image area is a filled closed area, wherein the closed area has an inside of which a color has different value from an outside of the closed area, or an unfilled closed area, wherein the closed area has an inside of which a color has same value from an outside of the closed area;
   producing a file by synthesizing said image areas based on positional information recognized; and
   setting up an overlaying sequence for each image area in accordance with the recognition result of the attributes,
   wherein said producing step includes producing file by overlaying said image areas in accordance with the overlaying sequence, which has been set up.

10. An image processing method according to the claim 9, wherein said setting up step includes setting up an overlaying sequence to overlay unfilled closed areas in front of filled closed area.

11. An image processing method according to the claim 10, wherein said step of recognizing attributes includes recognizing whether each extracted image areas is a line area that does not form any closed areas, and
   wherein said setting step includes setting overlaying sequence to overlay line areas in front of filled closed areas.

12. An image processing method according to the claim 9, wherein said extracting step includes a first extracting step of extracting text image areas, graphic image areas, and photographic image areas from image data, and a second extracting step of extracting filled closed areas, unfilled closed areas, and line areas that do not form any closed areas from the extracted graphic image areas;
   wherein said step of recognizing attributes includes recognizing attributes concerning whether each extracted image area is a text image area, a photographic image area, a filled closed area, an unfilled closed area or a line area; and
   said setting up step includes setting up the overlaying sequence for each image area of text image areas, photographic image areas, filled closed areas, unfilled closed areas, and line areas in accordance with the recognition results of the attributes.

13. An image processing method according to the claim 12, wherein said setting up step includes setting up the overlaying sequence to overlay text image areas in front, filled closed areas and photographic image areas in back, and unfilled closed areas and line areas are in between them.

14. An image processing method according to the claim 13, further comprising a step of discriminating whether at least a port of either filled closed areas or photographic image areas are overlapping each other;
   wherein said setting up step includes setting overlaying sequence for filled closed areas and photographic image areas, depending on the result of a comparison of the sizes of filled closed areas and photographic image areas, or the number of overlapping areas, when at least some of the filled closed areas and photographic image areas are overlapping.

15. An image processing method according to the claim 12, wherein said second extracting step comprises,
   a step of transforming image data in graphic image areas into vector data;
   a step of extracting closed areas based on the connection relation of a plurality of vector data;
   a step of judging whether the color information of internal points and external points of the extracted closed areas are the same; and
   a step of detecting filled closed areas based on the judgment result of whether the compared color information is the same.

16. An image processing device according to the claim 9, further comprising a step for scanning documents to obtain input image data,
   wherein said extracting step includes extracting a plurality of image areas from the input image data obtained from documents.

17. A computer executable program stored on a computer readable medium used for image processing, executing the procedures of:
   extracting a plurality of image areas from image data;
   recognizing positional information of each extracted image area;
   recognizing at least attributes concerning whether each extracted image area is a filled closed area, wherein the closed area has an inside of which a color has different value from an outside of the closed area, or an unfilled closed area wherein the closed area has an inside of which a color has same value from an outside of the closed;
   producing a file by synthesizing said image areas based on positional information recognized; and
   setting up an overlaying sequence for each image area in accordance with the recognition result of the attributes,
   wherein said producing procedure includes producing file by overlaying said image areas in accordance with the overlaying sequence, which has been set up.

18. A computer executable program stored on a computer readable medium according to the claim 17, wherein said setting up procedure includes setting up an overlaying sequence to overlay unfilled closed areas in front of filled closed areas.

19. A computer program executable stored on a computer readable medium according to the claim 18, wherein said procedure of recognizing attributes includes recognizing whether each extracted image area is a line area that does not form any closed area, and wherein said setting procedure includes setting overlaying to overlay line areas in front of filled closed areas.

20. A computer program executable stored on a computer readable medium according to the claim 17, wherein said extracting procedure includes a first extracting procedure of extracting text image areas, graphic image areas, and photographic image areas from image data, and a second extracting procedure of extracting filled closed areas, unfilled closed areas, and line areas that do not form any closed areas from the extracted graphic image areas;

wherein said procedure of recognizing attributes includes recognizing attributes concerning whether each extracted image area is a text image area, a photographic image area, a filled closed area, an unfilled closed area or a line area; and said setting up procedure includes setting up the overlaying sequence for each image area of text image areas, photographic image areas, filled closed areas, unfilled closed areas and line areas in accordance with the recognition results of the attributes.

21. A computer executable program stored on a computer readable medium according to the claim 20, wherein said setting up procedure includes setting up the overlaying sequence to overlay text image areas in front, filled closed areas and photographic image areas in back, and unfilled closed areas and line areas are in between them.

22. A computer executable program stored on a computer readable medium according to the claim 21, further comprising a procedure of discriminating whether at least a port of either filled closed areas or photographic image areas are overlapping each other;

wherein said setting up procedure includes setting overlaying sequence for filled closed areas and photographic image areas, depending on the result of a comparison of the sizes of filled closed areas and photographic image areas, or the number of overlapping areas, when at least some of the filled closed areas and photographic image areas are overlapping.

23. A computer executable program stored on a computer readable medium according to the claim 20, wherein said second extracting procedure comprises, a procedure of transforming image data in graphic image areas into vector data;

a procedure of extracting closed areas based on the connection relation of a plurality of vector data;

a procedure of judging whether the color information of internal points and external points of the extracted closed areas are the same; and a procedure of detecting filled closed areas based on the judgment result of whether the compared color information is the same.

24. A computer executable program stored on a computer readable medium according to the claim 20, further comprising a procedure for scanning documents to obtain input image data, wherein said extracting procedure includes extracting a plurality of image areas from the input image data obtained from documents.

* * * * *

UNITED STATES PATENT AND TRADEMARK OFFICE
CERTIFICATE OF CORRECTION

PATENT NO. : 7,609,881 B2 Page 1 of 1
APPLICATION NO. : 10/689669
DATED : October 27, 2009
INVENTOR(S) : Ichikawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1684 days.

Signed and Sealed this

Twelfth Day of October, 2010

David J. Kappos
*Director of the United States Patent and Trademark Office*